United States Patent [19]

Shiraishi et al.

[11] Patent Number: 5,128,425
[45] Date of Patent: Jul. 7, 1992

[54] EPOXY RESIN COMPOSITION FOR USE IN CARBON FIBER REINFORCED PLASTICS, CONTAINING AMINE OR AMIDE BASED FORTIFIERS

[75] Inventors: Yoshinobu Shiraishi; Hisashi Tada, both of Aichi, Japan

[73] Assignee: Mitsubishi Rayon Co., Ltd., Tokyo, Japan

[21] Appl. No.: 540,126

[22] Filed: Jun. 19, 1990

[30] Foreign Application Priority Data

Jun. 22, 1989 [JP] Japan .................................. 1-160078

[51] Int. Cl.$^5$ ........................ C08G 59/64; C08K 3/04; C08J 5/24
[52] U.S. Cl. ..................................... 525/484; 525/482; 528/93; 528/99; 528/103; 528/111; 523/468
[58] Field of Search ................. 528/99, 103, 111, 93; 525/482, 484

[56] References Cited

U.S. PATENT DOCUMENTS

| | | | |
|---|---|---|---|
| 4,480,082 | 10/1984 | McLean et al. | 528/119 |
| 4,714,648 | 12/1987 | Nagata | 528/120 |
| 4,767,805 | 8/1988 | Tada et al. | 523/468 |
| 4,956,411 | 9/1990 | Tada et al. | 528/120 |

FOREIGN PATENT DOCUMENTS 327125 8/1989 European Pat. Off. .

*Primary Examiner*—John C. Bleutge
*Assistant Examiner*—Frederick Krass
*Attorney, Agent, or Firm*—Oblon, Spivak, McClelland, Maier & Neustadt

[57] ABSTRACT

An epoxy resin composition for use in carbon fiber reinforced plastics which comprises the following components (A), (B), (C), and (D):

(A) an epoxy resin of the bisphenol A diglycidyl ether type;
(B) at least one compound selected from the group consisting of dicyandiamide, 2,6-xylenylbiguanide, o-tolylbiguanide, diphenylguanidine, adipyldihydrazide, azelayldihydrazide, and isophthalic acid dihydrazide;
(C) a compound represented by general formula (I)

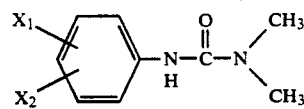

wherein $X_1$ and $X_2$ may be the same or different and each represents a hydrogen atom, a chlorine atom, a bromine atom, a nitro group, a methyl group, a methoxy group, an ethoxy group, or

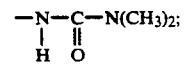

and
(D) a reaction product obtained by reacting an amide or amine represented by the general formula (II)

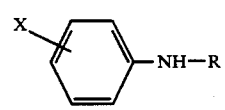

wherein X represents a hydrogen atom, a chlorine atom, a bromine atom, or a hydroxyl group and R represents a hydrogen atom,

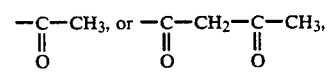

with an epoxy compound represented by the general formula (III) or (IV)

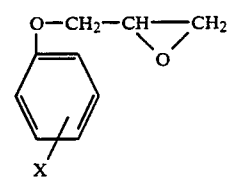

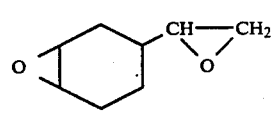

wherein X is the same as defined above.

The epxoy resin composition gives carbon fiber reinforced plastic products having both good mechanical properties and little warpage.

6 Claims, No Drawings

EPOXY RESIN COMPOSITION FOR USE IN CARBON FIBER REINFORCED PLASTICS, CONTAINING AMINE OR AMIDE BASED FORTIFIERS

FIELD OF THE INVENTION

The present invention relates to a novel epoxy resin composition for use in carbon fiber reinforced plastics.

BACKGROUND OF THE INVENTION

Because of the excellent mechanical properties, carbon fiber reinforced plastics (hereinafter abbreviated as CFRP) are being used as structural parts in a variety of fields and also used in sporting and leisure goods. Although various matrix resins are used in these applications, epoxy resins are extensively used owing to their attractive characteristics that they have superior mechanical properties, that no volatile ingredients are released during cure, that the shrinkage during cure is only little, and that the adhesion to carbon fibers is excellent.

However, with the recent trend toward weight and thickness reduction in CFRP products, defective products resulting from warpage after molding are increasing in number in the production of molded products such as pipes and this has been becoming a problem. In particular, in the field of fishing rod, a large number of warped products should be reformed or discarded, so that the production of fishing rods involves considerable waste from the economical and production efficiency standpoints. To eliminate such a problem, various measures have been taken such as, for example, varying the production conditions so as to diminish unevenness in wall thickness in fiber-reinforced plastics, especially those in the form of pipe, or to attain proper dispersion of carbon fibers, and decreasing the crosslink densities of matrix resins and diminishing residual thermal stresses generating at interfaces by incorporation of plasticizers.

The thermal stress $\sigma$ is expressed by the equation $\sigma = E(\alpha_R - \alpha_{CF})(T_g - T_O)$ (wherein E represents the elastic modulus of matrix resin, $\alpha_R$ and $\alpha_{CF}$ represent the linear expansion coefficient of the resin and that of the carbon fibers, respectively, Tg is the glass transition temperature of the resin, and $T_O$ is the temperature at which stress is measured). The above equation indicates that the thermal stress $\pi$ is decreased if E, $\alpha_R$, or Tg can be lowered. Based on the above, improvements of matrix resins are being made in various ways.

For example, it has been proposed to disperse rubber particles in a matrix to thereby lower E while retaining Tg, as disclosed, for example, in JP-A-58-108220. (The term "JP-A" as used herein means an "unexamined published Japanese patent application".) Further, JP-A-1-272621to JP-A-1-272624 propose to use specific polyether-modified silicone polymers to lower $\alpha_R$ and E without decreasing Tg. Both methods, however, are defective in that since the elastic modulus of resin (E) is lowered, the resulting CFRP products inevitably have insufficient mechanical properties. On the other hand, U.S. Pat. No. 4,480,082 and European Patent Application 0,103,392A discloses improvement of resin properties by use of a compound similar to that employed in the present invention, but there is no description therein teaching or suggesting use of a resin composition, such as that of the present invention, for diminishing the warpage of CFRP cross laminates or improving the strengths thereof. Thus, a simple and economical method of diminishing the warpage of carbon fiber reinforced plastic products while retaining their mechanical strengths has not yet been accomplished.

SUMMARY OF THE INVENTION

Under these circumstances, the present inventors have conducted intensive studies. As a result, they have found that by combining a specific epoxy compound, a hardener, a curing accelerator, and a reaction product obtained by the reaction between specific compounds, there can be obtained an epoxy resin composition for use in carbon fiber reinforced plastics which, when used as a matrix, gives carbon fiber reinforced plastic products, particularly cross laminates, having qood mechanical properties and molded products with little warpage. The present invention has been completed based on this finding.

Accordingly, it is an object of the present invention to provide an epoxy resin composition for use in CFRP, which gives CFRP products having both good mechanical properties and little warpage.

DETAILED DESCRIPTION OF THE INVENTION

The epoxy resin composition of the present invention for use in carbon fiber reinforced plastics comprises the following components (A), (B), (C), and (D):

(A) an epoxy resin of the bisphenol A diglycidyl ether type;

(B) at least one compound selected from the group consisting of dicyandiamide, 2,6-xylenylbiguanide, o-tolylbiguanide, diphenylguanidine, adipyldihydrazide, azelayldihydrazide, and isophthalic acid dihydrazide;

(C) a compound represented by general formula (I)

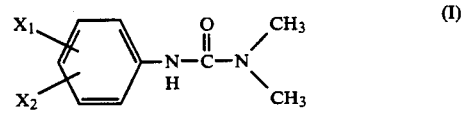

wherein $X_1$ and $X_2$ may be the same or different and each represents a hydrogen atom, a chlorine atom, a bromine atom, a nitro group, a methyl group, a methoxy group, an ethoxy group, or

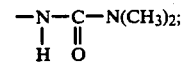

; and (D) a reaction product obtained by reacting an amide or amine represented by the general formula (II

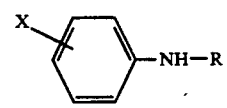

wherein X represents a hydrogen atom, a chlorine atom, a bromine atom, or a hydroxyl group and R represents a hydrogen atom,

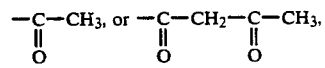

with an epoxy compound represented by the general formula (III) or (IV)

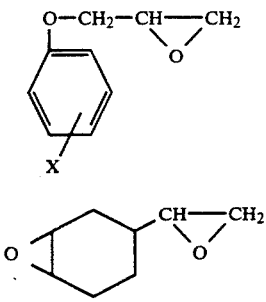

wherein X is the same as defined above.

The epoxy resin of the bisphenol A diglycidyl ether type, component (A), is curable at low temperatures and is also good in elongation and brittleness after cure. The bisphenol A type epoxy resin employed is not particularly limited, but especially preferred is one having an epoxy equivalent of about 350 to 1,200, because cured resins obtained therefrom exhibit good adhesion properties.

Examples of the epoxy resin (A) include Ep 828, Ep 834, Ep 1001, Ep 1004 (manufactured by Yuka Shell Epoxy Co., Ltd., Japan), YD 128, YD 011, YD 014 (manufactured by Tohto Kasei Co., Ltd.), DER 331, DER 337, DER 661, DER 664 (manufactured by Dow Chemical International Ltd.) and Epichlon 840, 860, 1050, and 4050 (manufactured by Dainippon Ink & Chemicals, Inc.).

The epoxy resin (A) employed in the present invention may also be a precondensate obtained by mixing an epoxy resin of the bisphenol A diglycidyl ether type with a polyamine or an acidic substance having a polycarboxylic acid group or a polycarboxylic anhydride group or both groups and heat-treating the resulting mixture to increase the viscosity of the system without causing gelation.

Examples of the polyamine used above include aromatic polyamines such as o-phenylenediamine, m-phenylenediamine, 4,4'-diaminodiphenyl sulfone, 3,3'-diaminodiphenyl sulfone, and 4,4'-diaminodiphenylmethane and aliphatic polyamines such as triethylenetetramine, isophoronediamine, 1,3-diaminocyclohexane, aminoethylethanolamine, and polymethylenediamine. These may be used alone or in combination of two or more thereof.

Examples of the acidic substance having a polycarboxylic acid group or a polycarboxylic anhydride group or both groups include phthalic anhydride, succinic anhydride, maleic anhydride, hexahydrophthalic anhydride, trimellitic anhydride, and itaconic anhydride. These acidic compounds may be used alone or in combination with two or more thereof.

For obtaining the precondensate, the polyamine or the acidic substance is mixed with the bisphenol A type epoxy resin, component (A), in an equivalent ratio of from 1:1.4 to 1:6.0, preferably from 1:1.5 to 1:5. This mixture is heat-treated at a temperature of from 50° to 200° C., preferably from 120° to 170° C., to increase the viscosity of the mixture without causing gelation, and then the reaction is ceased, thereby to obtain the precondensate. For terminating the reaction, a method in which the heating is stopped and the reaction mixture is cooled rapidly to room temperature, a method in which a solvent that does not react with an epoxy group, such as acetone or methyl ethyl ketone, is added, a method in which the reaction mixture is poured on a cooling plate to form a thin sheet thereof on the plate, or other method may be used.

The bisphenol A type epoxy resin, component (A), may be used in combination with other epoxy resins. Examples of such other epoxy resins include polyfunctional epoxy resins such as glycidyl ethers of bisphenol compounds such as bisphenol F and bisphenol S, glycidyl ether of phenolic or cresylic novolak, tetraglycidylamine of diaminodiphenylmethane or diaminodiphenyl sulfone, and triglycidyl compounds derived from m- or o-aminophenol or triphenylolmethane or derivatives of such triglycidyl compounds. Particularly preferred of these are a phenol-novolak epoxy resin, a cresol-novolak epoxy resin, and N,N,O-triglycidylaminophenol or derivatives thereof, from the standpoints of the storage stability of the resin composition and attaining improved heat resistance. Examples of phenol-novolak epoxy resins include Ep 152, Ep 154, Ep 157 (manufactured by Yuka Shell Epoxy Co., Ltd., Japan) and Epotohto YDN-180 (manufactured by Tohto Kasei Co., Ltd., Japan). Examples of cresol-novolak epoxy resins include ECN-1280 (manufactured by Ciba-Geigy) and YDCN-220L (manufactured by Tohto Kasei Co., Ltd.). Examples of aminophenol-based epoxy resins include ELM-100 and ELM-120 (manufactured by Sumitomo Chemical Co., Ltd., Japan). The mixing ratio of epoxy resin (A)/other epoxy resin is 100/0 to 30/70 (by weight).

In the present invention, a hardener, component (B), is used in combination with a curing accelerator, component (C). Particularly preferred examples of the hardener (B) include dicyandiamide, while those of the curing accelerator (C) include 3-(3,4-dichlorophenyl)-1,1-dimethylurea. The amount of the hardener (B) incorporated in the composition is preferably in the range of from 1 to 15 parts by weight, more preferably 2 to 12 parts by weight, most preferably 2 to 5 parts by weight, per 100 parts by weight of epoxy resin component, while that of the curing accelerator (C) is preferably from 1.5 to 15 parts by weight, more preferably 2 to 8 parts by weight, per 100 parts by weight of epoxy resin component.

The epoxy resin composition of the present invention further contains component (D). The incorporation of component (D) serves to diminish the warpage as described hereinabove. In addition, it also serves to reduce the water absorption of the resulting composition system and, thus, to greatly reduce the degrees to which properties of the final CFRP are adversely affected by water absorption. This also is one of the major effects of the incorporation of component (D). Component (D) is obtained by the reaction of the amine or amide of formula (II) with the epoxy compound of formula (III) or (IV). CFRP with little warpage can be obtained only when this component (D) is incorporated.

The above-described reaction product (D), i.e., component (D), can be easily obtained by reacting the compound of formula (II) with the compound of formula (III) or (IV) in a molar ratio of from 1:0.9 to 1:4.0, preferably 1:1 to 1:3.0, at a temperature of from 100° to 200° C. for 15 minutes to 2 hours. The resulting reaction mixture may be used as it is, but it is preferable that the reaction product obtained be purified before use by removing unreacted ingredients by evaporation at an elevated temperature (50°-200° C.) under reduced pressure (1 mmHg or lower). The amount of the reaction product (D) incorporated in the composition is preferably in the range of from 5 to 100%, more preferably 10 to 60%, and particularly preferably 20 to 50%, by weight based on the total amount of epoxy resin component, component (B) and component (C). If the amount of the reaction product (D) incorporated is below 5% by weight, the effect of diminishing the warpage of carbon fiber reinforced plastics is insufficient, while if the amount thereof exceeds 100% by weight, the mechanical properties of carbon fiber reinforced plastics are impaired.

The resin composition of the present invention is usefully employed as an intermediate for carbon fiber reinforced plastics. Carbon fibers in such carbon fiber reinforced plastics can be arranged in any of the configurations including a tape or sheet form in which carbon fibers are unidirectionally arranged, a mat form, a fabric form, etc. According to applications, carbon fibers are used in combination with glass fibers, organic fibers, and metal fibers.

The characteristic features of the epoxy resin composition of the present invention reside in that it gives carbon fiber reinforced plastics which show good storage stability at room temperature, are curable at low temperatures, and show excellent mechanical properties particularly when the CFRP are cross laminates, pseudo-isotropic products, or the like, which are of practical importance, and that molded products such as pipes and fishing rod tip portions can be manufactured with less warpage in improved yields, so that such products can be produced at very low cost and significantly heightened production efficiency.

Therefore, the epoxy resin composition of the present invention can be used in a variety of applications ranging from sporting and leisure applications such as fishing rods and golf club shafts to industrial applications such as automobiles, aircrafts, and rockets.

The present invention is explained below in more detail by reference to the following examples, in which all parts are by weight.

I. PROPERTIES OF CFRP WERE MEASURED ACCORDING TO THE FOLLOWING METHODS.

(1) Interlayer Shear Strength (ILSS)

Measurement was made as follows in accordance with ASTM D 2344.

A plate test piece 15 mm long, 10 mm wide, and 2 mm thick was placed on supports (whose top ends had a radius of 3.2 mm) arranged at a span of 8 mm. Three-point bending test was performed by pressing this test piece at the midspan with an indenter whose lower end had a radius of 3.2 mm, with the crosshead speed being 2 mm/min. The ILSS was calculated using the following equation, where L is the span (mm), T is the sample thickness (mm), W is the sample width (mm), and P is the load at break (kg).

$$ILSS = 3P/4WT (kg/mm^2)$$

(2) Bending Test

Measurements were made as follows in accordance with ASTM D 790.

(i) 0° Bending Test

Using a plate test piece 100 mm long, 10 mm wide, and 2 mm thick, bending test was conducted in the same manner as in the ILSS test except that the span was 80 mm. The flexural strength and modulus in the 0° direction were calculated using the following equations.

$$0° \text{flexural strength } (FS//) = 3PL/2WT^2 (kg/mm^2)$$

$$0° \text{flexural strength } (FM//) = PL^3 \times 10^{-3}/4WT^3\delta (t/mm^2)$$

wherein is the amount (mm) in which the crosshead had descended at the time when the load is P' (kg) in the initial stage of the test.

(ii) 90° Bending Test

Using a plate test piece 60 mm long, 10 mm wide (in the CF direction), and 2 mm thick, bending test was conducted in the same manner as in the 0° bending test (i) above except that the span was 32 mm. From the data obtained, the 90° flexural strength (FSI) and 90° flexural modulus (FMI) were calculated. II. The following abbreviations and symbols are used in the examples for respective compounds.

Ep 828, Ep 1001, Ep 1004: bisphenol A-type epoxy resin (manufactured by Yuka Shell Epoxy Co., Ltd.)

Ep 807: bisphenol F-type epoxy resin (manufactured by Yuka Shell Epoxy Co., Ltd.)

Ep 152, Ep 154: phenol-novolak epoxy resin (manufactured by Yuka Shell Epoxy Co., Ltd.)

ELM-120: m-N,N-diglycidylaminophenyl glycidyl ether (manufactured by Sumitomo Chemical Co., Ltd.)

DDS: 4,4'-diaminodiphenyl sulfone

DICY: dicyandiamide

DCMU: 3-(3,4-dichlorophenyl)-1,1-dimethylurea

REFERENCE EXAMPLE 1

Synthesis of N-[4-(2-hydroxy-3-phenoxypropoxy)-phenyl]acetanude [(D)-1]

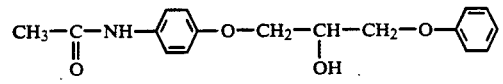

p-Hydroxyacetanilide was mixed with phenyl glycidyl ether in a molar ratio of 1:1.05, and a reaction was allowed to proceed by heating this mixture at 160° C. for 60 minutes, thereby obtaining a liquid reaction mixture that was viscous at room temperature. This reaction mixture was heated to 150° C. under a reduced pressure of 1 mmHg to remove the remaining unreacted phenyl glycidyl ether, thereby obtaining a reaction product, (D)-1. The absence of epoxy group in this reaction product (D)-1 was ascertained by subjecting the reaction product to infrared spectrophotometry. Reaction product (D)-1 was further subjected to gel permeation chromatography after being dissolved in chloroform. As a result, it was found that reaction product (D)-1 was a mixture which contained, besides the desired compound formed by the reaction of the 1:1 reactants, a product of a reaction involving the -NH- group and also contained high molecular weight compounds formed through further reactions.

REFERENCE EXAMPLE 2

Synthesis of N-phenyl-N-(2-hydroxy-3-phenoxypropyl)-acetoacetamide [(D)-2]

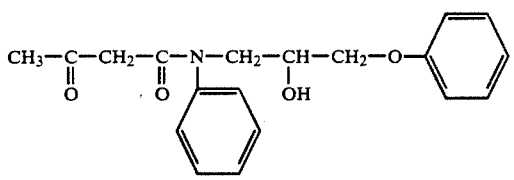

Acetoacetanilide was mixed with phenyl glycidyl ether in a molar ratio of 1:1.2, and a reaction was allowed to proceed by heating the mixture at 170° C. for 1 hour. Then, the remaining unreacted phenyl glycidyl ether was removed in the same manner as in Reference Example 1, thereby obtaining a reaction product, (D)-2. Reaction product (D)-2 was further subjected to infrared spectrophotometry and gel permeation chromatography in the same manner as in Reference Example 1. This reaction product (D)-2 was a mixture containing, besides the desired compound formed by the reaction of the 1:1 reactants, high molecular weight compounds formed through further reactions.

REFERENCE EXAMPLE 3

Synthesis of N-[2-hydroxy-2-(cyclohexene oxide)ethyl]aniline [(D)-3]

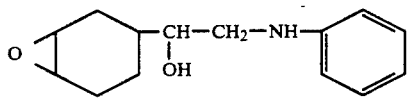

Aniline was mixed with 4-vinylcyclohexene dioxide in a molar ratio of 1:2.1, and a reaction was allowed to proceed by heating the mixture at 100° C. for 45 minutes in the same manner as in Reference Example 1, thereby obtaining a viscous liquid reaction product, (D)-3. Reaction product (D)-3 was further subjected to infrared spectrophotometry and gel permeation chromatography in the same manner as in Reference Example 1. Like the reaction product obtained in Reference Example 1, this reaction product (D)-3 was a mixture containing, besides the desired compound formed by the reaction of the 1:1 reactants, high molecular weight compounds formed through further reactions.

EXAMPLE 1

100 Parts of Ep 1001 was introduced into a heated kneader and melted, and then 4 parts of DICY and 5 parts of DCMU were added thereto. Further, (D)-1 was added in an amount of 30 wt% based on the total amount of the Ep 1001, DICY, and DCMU. The resulting mixture was thoroughly kneaded to obtain an epoxy resin composition for use in prepregs.

The above-obtained resin composition was heated at 60° C. to 70° C. and spread on a release paper to form a thin film of the composition, thereby obtaining a hot-melt film. This film was wound up on a drum, and carbon fibers (Pyrofil ® T-1 manufactured by Mitsubishi Rayon Co., Ltd., Japan) oriented unidirectionally were impregnated with the composition film with heating of 130° C., thereby preparing prepregs. The prepregs thus obtained had proper adhesion properties and moderate stiffness and, even after storage at 25° C. for 1.5 months, such adhesion properties and stiffness changed little, showing good storage stability. The adhesion properties and stiffness for prepregs were evaluated by winding prepregs to a pencil having a diameter of about 8 mm at 25° C. In this evaluation method, if prepregs are wound neatly and retains a pipe form, they are considered as those which have proper adhesion properties and moderate stiffness with no problem.

The prepregs obtained above were superimposed unidirectionally on one another, and this assembly was placed in a mold after being regulated so as to result in a molded product having a carbon fiber content of 60% by volume. The prepreg assembly in the mold was then heat-cured for 1 hour with a hot press heated to 130° C., thereby obtaining a CFRP molded product. Properties of this product are shown in Table 1.

TABLE 1

| 0° Bending test | | 90° Bending test | | |
|---|---|---|---|---|
| FS// GPa (kg/mm²) | FM// GPa (t/mm²) | FS⊥ MPa (kg/mm²) | FM⊥ GPa (t/mm²) | ILSS MPa (kg/mm²) |
| 1.85 (189) | 124 (12.6) | 136 (13.9) | 8.82 (0.90) | 97.1 (9.9) |

The results in Table 1 show that the CFRP product as a composite material has good properties.

COMPARATIVE EXAMPLE 1

A CFRP product was prepared in the same manner as in Example 1 except that reaction product (D)-1 as component (D) was omitted in preparing the resin composition. Properties of the product were evaluated and the results obtained are shown in Table 2.

TABLE 2

| 0° Bending test | | 90° Bending test | | |
|---|---|---|---|---|
| FS// GPa (kg/mm²) | FM// GPa (t/mm²) | FS⊥ MPa (kg/mm²) | FM⊥ GPa (t/mm²) | ILSS MPa (kg/mm²) |
| 1.77 (181) | 123 (12.5) | 96.1 (9.8) | 7.45 (0.76) | 90.2 (9.2) |

Compared to those properties of the CRFP product produced by use of the composition of the present invention which are shown in Table 1, the 90° flexural properties of the product of Comparative Example 1 are extremely poor. This means that by use of the resin composition of the present invention, the amounts of materials used in the 90°-direction reinforcement of CFRP pipes can be greatly reduced, so that the weights and wall thicknesses of CFRP pipes can be reduced significantly. The use of the composition of the present invention is also advantageous from the economical standpoint.

EXAMPLE 2 AND COMPARATIVE EXAMPLE 2

The CFRP plates prepared in Example 1 and Comparative Example 1 were cut into ILSS test pieces. After being heat-dried at 60° C. for 12 hours, the test pieces were placed or immersed for 1 week in (1) a desiccator, (2) 25° C. water, or (3) 50° C. warm water, and decreases in ILSS due to water absorption were determined. ILSS Measurement was performed at 25° C.

TABLE 3

| | Results of ILSS measurement MPa <kg/mm²> | | |
|---|---|---|---|
| Test piece treatment | Absolute dryness | Water immersion | |
| | | 25° C. × 1 week | 50° C. × 1 week |
| Example 2 | 97.1 | 94.1 | 91.2 |
| | <9.9> (0) | <9.6> (0.1) | <9.3> (0.4) |
| Comparative Example 2 | 91.2 | 85.3 | 79.4 |
| | <9.3> (0) | <8.7> (0.3) | <8.1> (0.6) |

Figure in each ( ) indicates weight increase (%) due to water absorption.

Table 3 shows that the CFRP product employing the matrix resin according to the present invention exhibits low water absorption and, hence, suffers only slight decreases in ILSS due to water absorption.

EXAMPLE 3

9 Parts of DDS was added to 100 parts of Ep 828, and the resulting mixture was placed in a heating vessel equipped with a stirrer. This mixture was allowed to react for 4 hours with stirring while being heated at 150° C. Thereafter, the reaction mixture was poured on a water-cooled panel to form a thin film of the mixture, thereby terminating the reaction. Thus, precondensate (A) was obtained. 100 Parts of this precondensate (A) was uniformly mixed by stirring at 70° C. with 4 parts of DICY and 5 parts of DCMU. To this mixture was subsequently added additive (D)-1 in an amount of 30 wt% based on the amount of the mixture, and the resulting mixture was homogenized by stirring to obtain a resin composition for use as matrix. Using the resin composition, a CFRP product was prepared in the same manner as in Example 1. Properties of this product were evaluated and the results obtained are shown in Table 4.

TABLE 4

| 0° Bending test | | 90° Bending test | | |
|---|---|---|---|---|
| FS// GPa (kg/mm²) | FM// GPa (t/mm²) | FS⊥ MPa (kg/mm²) | FM⊥ GPa (t/mm²) | ILSS MPa (kg/mm²) |
| 1.86 (190) | 124.5 (12.7) | 145 (14.8) | 9.31 (0.95) | 102 (10.4) |

Table 4 shows that the above-obtained CRFP product, like the product in Example 1, has good properties.

EXAMPLE 4 AND COMPARATIVE EXAMPLE 3

Using the prepregs prepared in each of Example 1, Comparative Example 1, and Example 3, a 1 mm-thick 12-ply cross laminate having a (0°, 90°)₆ construction was produced. This laminate was cut into 100 mm (0° direction) × 10 mm (90° direction) and subjected to a three-point bending test, with the span being 40 mm and the 0°-direction side upward. The flexural strengths and flexural moduli of the laminates were determined in the same manner as in the 0° bending test in Example 1. The results obtained are shown in Table 5.

TABLE 5

| Resin composition | Flexural strength GPa (kg/mm²) | Flexural modulus GPa (t/mm²) |
|---|---|---|
| Same as that in Ex. 1 | 1.52 (155) | 68.6 (7.0) |
| Same as that in Ex. 3 | 1.55 (158) | 70.6 (7.2) |
| Same as that in Comp. Ex. 1 | 1.13 (115) | 64.8 (6.1) |

Table 5 clearly shows that by use of the resin compositions of the present invention, both flexural strengths and moduli of the cross laminates can be heightened significantly.

EXAMPLE 5 AND COMPARATIVE EXAMPLE 4

The prepregs prepared in Example 1 were cross-laminated to each other. This laminate was wound threefold around a 5-φ mandrel made of iron, and a polypropylene tape (15 mm wide) was lapped over the wound laminate at a tape tension of 3 kg/15 mm. The resulting wound laminate was placed in a curing oven and heat-cured at 130° C. for 2 hours. After completion of the cure, the temperature in the oven was lowered to room temperature while the oven was kept closed. Thus, a pipe having a length of 600 mm was formed.

Likewise, the prepregs prepared in Comparative Example 1 were used to form a pipe.

Each of the pipes obtained above was supported at two points thereon 500 mm apart. While the pipe thus supported are being rotated on its axis, the deflection at the middle point between the supports was measured by means of a laser made by Mitsubishi Rayon Co., Lts. With respect to each of Example 5 and Comparative Example 4, 30 pipes were examined for deflection. Table 6 summarizes the average deflection values and the yields which were calculated with products having deflections of 0.5 mm or more being taken as defective products due to the warpage.

TABLE 6

| Resin used | Average deflection value (mm) | Yield (%) |
|---|---|---|
| Same as that in Ex. 1 | 0.32 | 94 |
| Same as that in Comp. Ex. 1 | 0.49 | 76 |

Table 6 clearly shows that use of the resin composition of the present invention serves to give CFRP pipes with less warpage and to greatly heighten the yield of the products. Hence, the resin composition of the present invention is far more advantageous from the economical standpoint.

EXAMPLE 6

Using precondensate (A) prepared in Example 3, a unidirectional CFRP laminate and a CFRP cross laminate were obtained in the same manner as in Examples 1 and 3 except that 20 wt% of (D)-2 or 40 wt% of (D)-3 was used as an additive. Properties of the thus-obtained CFRP laminates were evaluated, and the results obtained are shown in Table 7.

TABLE 7

| Resin composition | Unidirectional CFRP laminate | | | | | CFRP cross laminate | |
|---|---|---|---|---|---|---|---|
| | 0° Bending test | | | 90° Bending test | | Flexural strength GPa (kg/mm²) | Flexural modulus GPa (t/mm²) |
| | FS// GPa (kg/mm²) | FM// GPa (t/mm²) | ILSS MPa (kg/mm²) | FS⊥ MPa (kg/mm²) | FM⊥ GPa (t/mm²) | | |
| containing (D)-2 | 1.89 (193) | 125 (12.8) | 106 (10.8) | 146 (14.9) | 9.71 (0.99) | 1.56 (159) | 96.6 (7.1) |
| containing (D)-3 | 1.91 (195) | 124 (12.6) | 108 (11.0) | 125 (12.8) | 9.41 (0.96) | 1.59 (162) | 71.6 (7.3) |

Like the resin composition used in Example 3, the resin compositions used above gave CFRP laminates having good properties.

EXAMPLE 7

Using the prepregs prepared in Example 6, pipes 600 mm long were formed in the same manner as in Example 5. These pipes were evaluated as in Example 5 and the yields were calculated with products having deflections not less than the specified value being taken as defective products due to the warpage. As a result, the yield of the pipes formed by use of the (D)-2-containing resin composition was as high as 98% and that for the (D)-3-containing resin composition was also as high as 95%.

EXAMPLE 8

In a heated kneader were introduced 40 parts of Ep 1001 and 60 parts of Ep 152, and this mixture was thoroughly kneaded. Thereafter, 4.5 parts of DICY and 5 parts of DCMU were added thereto, and (D)-1 was further added in an amount of 30 wt% based on the total amount of the Ep 1001, Ep 152, DICY, and DCMU. The resulting mixture was thoroughly kneaded to obtain an epoxy resin composition for use in prepregs.

Using the above-obtained resin composition, prepregs were prepared in the same manner as in Example 1. The thus-obtained prepregs had adequate adhesion properties and moderate stiffness and, even after storage at 25° C. for 1.5 months, such adhesion properties and stiffness did not change, showing good storage stability.

The thus-obtained prepregs were used to prepare a molded product in the same manner as in Example 1. This product was evaluated for flexural properties and ILSS, and the results obtained are shown in Table 8.

TABLE 8

| 0° Bending test | | 90° Bending test | | ILSS MPa (kg/mm²) |
|---|---|---|---|---|
| FS// GPa (kg/mm²) | FM// GPa (t/mm²) | FS⊥ MPa (kg/mm²) | FM⊥ GPa (t/mm²) | |
| 1.88 (192) | 125 (12.7) | 145 (14.8) | 9.41 (0.96) | 103 (10.5) |

Table 8 shows that the molded product as a composite material has good properties.

EXAMPLE 9

Twelve prepregs prepared in Example 8 were superposed crosswise on one another to form an assembly having a construction of (0°,90°)₆. This assembly was heated at 130° C. at a pressure of 6 kg/cm² for 1 hour, thereby obtaining a CFRP laminate 1 mm thick. This laminate was subjected to a bending test in the same manner as in Example 3. As a result, the laminate was found to have good properties, with the flexural strength being 1.49 GPa (152 kg/mm²) and the flexural modulus being 60.8 GPa (6.2 t/mm²).

COMPARATIVE EXAMPLE 5

A resin composition was prepared in the same manner as in Examples 8 and 9 except that (D)-1 was not incorporated. CFRP laminate was prepared using this resin composition and properties of the laminate were evaluated, in the same manner as in Examples 8 and 9. The results obtained are shown in Table 9.

TABLE 9

| Unidirectional CFRP laminate | | | | | CFRP cross laminate | |
|---|---|---|---|---|---|---|
| 0° Bending test | | | 90° Bending test | | Flexural strength GPa (kg/mm²) | Flexural modulus GPa (t/mm²) |
| FS// GPa (kg/mm²) | FM// GPa (t/mm²) | ILSS MPa (kg/mm²) | FS⊥ MPa (kg/mm²) | FM⊥ GPa (t/mm²) | | |
| 1.85 (189) | 124 (12.6) | 91.1 (9.3) | 116 (11.8) | 9.02 (0.92) | 1.17 (119) | 59.8 (6.1) |

Although the 0° flexural strength of the unidirectional CFRP laminate obtained in Example 6 by use of the resin composition of this invention is equal to that of the above-obtained unidirectional CFRP laminate, the 90° flexural strength of the former is higher than that of the latter by as large as 25%. This means that by use of the resin composition of the present invention, unidirectional laminate products can be produced with smaller amounts of cross-directional reinforcement materials. With respect to cross laminates, which are practically more important, the resin composition of the present invention can impart higher performance to cross laminates, so that weight reduction and even higher performance can be expected.

EXAMPLE 10

Using the prepregs prepared in Example 8, pipes having a length of 600 mm were formed in the same manner as in Example 5. None of the pipes developed defects such as warpage, cracking, etc. during cure, and the yield of the products was as high as 93%.

EXAMPLE 11

CFRP laminates were obtained in the same manner as in Example 8 except that a resin composition prepared by use of 20 wt% of (D)-2 in place of (D)-1 in Example 8 and a resin composition prepared by use of 40 wt% of (D)-3 in place of (D)-1 in Example 8 were used. Properties of the CFRP laminates were evaluated and the results obtained are shown in Table 10.

TABLE 10

| Resin composition | Unidirectional CFRP laminate | | | | | CFRP cross laminate | |
|---|---|---|---|---|---|---|---|
| | 0° Bending test | | | 90° Bending test | | Flexural strength GPa (kg/mm$^2$) | Flexural modulus GPa (t/mm$^2$) |
| | FS// GPa (kg/mm$^2$) | FM// GPa (t/mm$^2$) | ILSS MPa (kg/mm$^2$) | FS⊥ MPa (kg/mm$^2$) | FM⊥ GPa (t/mm$^2$) | | |
| containing (D)-2 | 1.85 (189) | 121 (12.3) | 93.1 (9.5) | 132 (13.5) | 8.92 (0.91) | 1.55 (158) | 61.8 (6.3) |
| containing (D)-3 | 1.94 (198) | 123 (12.5) | 91.1 (9.3) | 125 (12.8) | 9.31 (0.95) | 1.33 (136) | 60.8 (6.2) |

Table 10 shows that like the laminates produced by use of the resin composition employing (D)-1, the above-obtained unidirectional CFRP laminate has good properties and the CFRP cross laminate has extremely good properties.

EXAMPLE 12

60 Parts of Ep 154 and 20 parts of Ep 828 were mixed and homogenized. Thereto were added 20 parts of Ep 1004 and 30 parts of ELM-120, and these ingredients were sufficiently mixed by stirring. Subsequently, 4 parts of DICY and 5 parts of DCMU were added to the above-obtained mixture, and (D)-1 was further added in an amount of 30 wt% based on the total amount of the Ep 154, Ep 828, EP 1004, ELM-120, DICY and DCMU. The resulting mixture was stirred and homogenized to obtain an epoxy resin composition for use in prepregs.

Using the resin composition prepared above, a unidirectional CFRP laminate was obtained in the same manner as in Example 1. Properties of this CFRP laminate were evaluated and the results obtained are shown in Table 11.

TABLE 11

| 0° Bending test | | 90° Bending test | | ILSS MPa (kg/mm$^2$) |
|---|---|---|---|---|
| FS// GPa (kg/mm$^2$) | FM// GPa (t/mm$^2$) | FS⊥ MPa (kg/mm$^2$) | FM⊥ GPa (t/mm$^2$) | |
| 2.14 (218) | 125 (12.7) | 123 (12.5) | 9.41 (0.96) | 116 (11.8) |

Although this laminate is slightly lower in 90° flexural strength than the laminate produced in Example 1, its 0° flexural strength is high, so that production of high-performance molded articles is expected.

EXAMPLE 13

Using the prepregs prepared in Example 12, a cross laminate was obtained. This laminate showed good properties with the flexural strength being 1.65 GPa (168 kg/mm$^2$) and the flexural modulus being 61.8 GPa (6.3 t/mm$^2$).

Further, pipes 600 mm long were formed in the same manner as in Example 5. As a result, the percentage of defective products due to warpage, cracking, etc. caused during cure was as low as 4% or less.

EXAMPLE 14

Five kinds of resin compositions, the formulations for which are shown in Table 12, were prepared by use of Ep 1001 as component (A), (D)-1 as component (D), and various kinds of hardeners and cure accelerators as components (B) and (C) respectively. Using these resin compositions, CFRP laminates and pipes were produced. Properties of these products are summarized in Table 13.

TABLE 12

| Run No. | Component (A) Ep 1001 | Component (B) | | Component (C) | | | Component (D) | |
|---|---|---|---|---|---|---|---|---|
| | | Kind | Amount (parts) | —X$_1$ | —X$_2$ | Amount (parts) | Kind | Amount (parts) |
| 1 | 100 | 2,6-xylenyl-biguanide | 5 | —Cl | —Cl | 5 | (D)-1 | 30 |
| 2 | 100 | adipyldihydrazide | 3 | —Cl | —Cl | 5 | (D)-1 | 30 |
| 3 | 100 | DICY | 4 | —Br | —Br | 4 | (D)-1 | 30 |
| 4 | 100 | DICY | 4 | —NO$_2$ | —NO$_2$ | 4 | (D)-1 | 30 |
| 5 | 100 | DICY | 4 | —H | —H | 6 | (D)-1 | 30 |

TABLE 13

| Run No. | Unidirectional CFRP laminate | | | | | CFRP cross laminate | | Yield of pipes (%) |
|---|---|---|---|---|---|---|---|---|
| | FS// GPa (kg/mm$^2$) | FM// GPa (t/mm$^2$) | ILSS MPa (kg/mm$^2$) | FS⊥ MPa (kg/mm$^2$) | FM⊥ GPa (t/mm$^2$) | FS GPa (kg/mm$^2$) | FM GPa (t/mm$^2$) | |
| 1 | 1.82 (186) | 119 (12.1) | 96.1 (9.8) | 126 (12.9) | 9.02 (0.92) | 1.39 (142) | 69.4 (7.08) | 96 |
| 2 | 1.81 (185) | 120 (12.2) | 97.1 (9.9) | 129 (13.2) | 9.21 (0.94) | 1.37 (140) | 69.5 (7.09) | 96 |
| 3 | 1.85 (189) | 121 (12.3) | 98.0 (10.0) | 130 (13.3) | 9.31 (0.95) | 1.40 (143) | 68.6 (7.00) | 97 |
| 4 | 1.87 (191) | 125 (12.7) | 99.0 (10.1) | 131 (13.4) | 9.02 (0.92) | 1.38 (141) | 68.9 (7.03) | 95 |
| 5 | 1.86 | 123 | 102 | 136 | 8.82 | 1.42 | 70.1 | 96 |

TABLE 13-continued

| Run No. | Unidirectional CFRP laminate | | | | | CFRP cross laminate | | Yield of pipes (%) |
|---|---|---|---|---|---|---|---|---|
| | FS// GPa (kg/mm$^2$) | FM// GPa (t/mm$^2$) | ILSS MPa (kg/mm$^2$) | FS⊥ MPa (kg/mm$^2$) | FM⊥ GPa (t/mm$^2$) | FS GPa (kg/mm$^2$) | FM GPa (t/mm$^2$) | |
| | (190) | (12.5) | (10.4) | (13.9) | (0.90) | (145) | (7.15) | |

With respect to each resin composition, it is apparent that CFRP laminates with good flexural properties are obtained and pipes are produced in a high yield.

While the invention has been described in detail and with reference to specific embodiments thereof, it will be apparent to one skilled in the art that various changes and modifications can be made therein without departing from the spirit and scope thereof.

What is claimed is:

1. An epoxy resin composition for use in carbon fiber reinforced plastics which comprises the following components (A), (B), (C), and (D):

(A) an epoxy resin of bisphenol A diglycidyl ether;
   (B) at least one compound selected from the group consisting of dicyandiamide, 2,6-xylenylbiguanide, o-tolylbiguanide, diphenylguanidine, adipyldihydrazide, azelayldihydrazide, and isophthalic acid dihydrazide;
   (C) a compound represented by general formula (I)

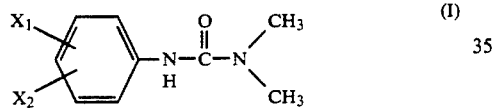

wherein $X_1$ and $X_2$ are the same or different and each represents a hydrogen atom, a chlorine atom, a bromine atom, a nitro group, a methyl group, a methoxy group, an ethoxy group, or

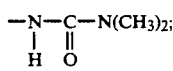

(D) a reaction product of the formula

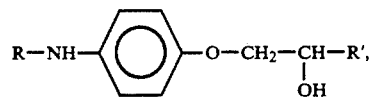

wherein R' represents

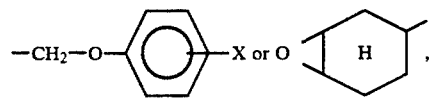

obtained by reacting an amide represented by the general formula (II)

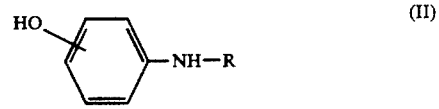

wherein X represents a hydrogen atom, a chlorine atom, a bromine atom, or a hydroxyl group and R represents

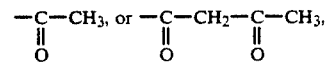

with an epoxy compound represented by the general formula (III) or (IV)

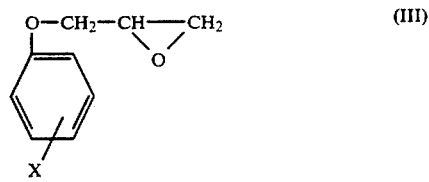

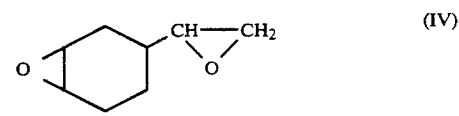

wherein X is the same as defined above.

2. An epoxy resin composition as in claim 1, wherein component (A) is a precondensate obtained by heat-treating an epoxy resin of bisphenol A diglycidyl ether with a polyamine or an acidic substance having either or both of a polycarboxylic acid group and a polycarboxylic anhydride group.

3. An epoxy resin composition as in claim 1, wherein component (A) is employed in combination with at least one epoxy resin selected from the group consisting of a phenol-novolak epoxy resin, a cresol-novolak epoxy resin, N,N,O-triglycidylaminophenol, and derivatives thereof.

4. An epoxy resin composition as in claim 1, wherein component (B) is dicyandiamide.

5. An epoxy resin composition as in claim 1, wherein component (C) is 3-(3,4-dichlorophenyl)-1,1-dimethylurea.

6. An epoxy resin composition as in claim 1, wherein component (D) is a reaction product of p-hydroxyacetanilide with phenyl glycidyl ether.

* * * * *